(12) United States Patent
Chakrapani et al.

(10) Patent No.: US 10,589,672 B1
(45) Date of Patent: Mar. 17, 2020

(54) DOOR HANDLE ASSEMBLY INCORPORATING A VEHICLE OCCUPANT ALERT SYSTEM

(71) Applicant: GM GLOBAL TECHNOLOGY OPERATIONS LLC, Detroit, MI (US)

(72) Inventors: Varun Chakrapani, Bangalore (IN); Ramachandra Rao M. R, Bangalore (IN); Mune Gowda K N, Bangalore (IN); Satyanarayana S, Bangalore (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/270,755

(22) Filed: Feb. 8, 2019

(51) Int. Cl.
*B60Q 9/00* (2006.01)
*E05B 85/12* (2014.01)
*E05B 85/16* (2014.01)
*B60Q 3/267* (2017.01)
*E05B 1/00* (2006.01)

(52) U.S. Cl.
CPC ............... *B60Q 9/00* (2013.01); *B60Q 3/267* (2017.02); *E05B 1/0084* (2013.01); *E05B 81/77* (2013.01); *E05B 85/12* (2013.01); *E05B 85/16* (2013.01); *B60Q 2500/10* (2013.01); *E05Y 2900/531* (2013.01)

(58) Field of Classification Search
CPC ...... B60Q 9/00; B60Q 3/267; B60Q 2500/10; E05B 1/0084; E05B 15/00; E05B 17/00; E05B 85/12; E05B 81/77; E05B 85/10; E05B 85/107; E05B 85/14; E05B 85/16; E05B 39/007; E05Y 2900/531; G08B 5/00; G08B 6/00; G08B 21/00; G08B 21/02
See application file for complete search history.

(56) References Cited

U.S. PATENT DOCUMENTS

| 6,264,257 | B1 | 7/2001 | Meinke |
| 7,199,317 | B2 | 4/2007 | Ieda et al. |
| 7,232,164 | B2 | 6/2007 | Lee |
| 7,530,610 | B2 | 5/2009 | Tanimoto et al. |

(Continued)

FOREIGN PATENT DOCUMENTS

DE    102016113167 A1 *  1/2018  ............. E05B 85/10

OTHER PUBLICATIONS

Matthew Sparkes, "New Jaguar 'taps driver on shoulder' to warn of cyclists", Jan. 20, 2015, <https://www.telegraph.co.uk/technology/11354765/New-Jaguar-taps-driver-on-shoulder-to-warn-of-cyclists.html>, pp. 1-3.

*Primary Examiner* — Brian Wilson

(57) ABSTRACT

A door handle assembly including a handle base fixed to the vehicle door; a handle member for opening the vehicle door, wherein the handle member is movable between latched and unlatched positions; a handle frame mounted to the vehicle door, the handle frame includes a peripheral rim; a first lighting strip operatively embedded around the peripheral rim, the first lighting strip configured to illuminate upon activation; a motor and a cam, where the cam is in operative contact with a second end of the handle base, where the motor will cause the cam to rotate upon activation, where rotation of the cam will impart vibrations throughout the handle base and thus cause the handle member to vibrate; and a touch sensor located on the handle member, where the touch sensor can recognize when a user grips the handle member.

17 Claims, 8 Drawing Sheets

(56) References Cited

U.S. PATENT DOCUMENTS

| | | | |
|---|---|---|---|
| 2009/0257241 A1* | 10/2009 | Meinke | B60Q 1/2669 |
| | | | 362/546 |
| 2011/0120022 A1 | 5/2011 | Papanikolaou et al. | |
| 2017/0217364 A1* | 8/2017 | Noboritate | B60R 13/0243 |
| 2018/0238098 A1* | 8/2018 | Rhode | E05F 15/73 |

* cited by examiner

DOOR HANDLE ASSEMBLY INCORPORATING A VEHICLE OCCUPANT ALERT SYSTEM

INTRODUCTION

Vehicle doors typically include a movable handle that is operably connected to a door latch. As well known, the door handle assembly includes a mechanism for releasing the latch by rotation of the door handle with respect to a door when a user pulls the door handle with his/her hand. These handles can also provide a good means to notify a vehicle occupant during the occurrence of a vehicle related event. For example, the handles can be equipped to remind a driver their kid is in the back seat of their car. As such, the door handle could provide haptic feedback and visual alerts to remind the driver that they should not leave their child behind. Incorporating door handles into occupant alert systems can be beneficial when other alerting means fail to grasp the occupant's attention (e.g., a notification on the driver information center may not effectively get the occupant's attention in all situations). It is therefore desirable to equip vehicle door handles with the ability to alert vehicle occupants of certain vehicle related events. Moreover, other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a door handle assembly for a vehicle door, the door handle assembly including: a handle base fixed to the vehicle door; a handle member for opening the vehicle door, wherein the handle member is movable between latched and unlatched positions; a handle frame mounted to the vehicle door and interposed between the handle base and handle member, the handle frame includes a peripheral rim portion; a first lighting strip operatively embedded around the peripheral rim portion, the first lighting strip configured to illuminate upon activation; a motor and a cam, where the cam is in operative contact with a second end of the handle base, where the motor will cause the cam to rotate upon activation, where rotation of the cam will impart vibrations throughout the handle base, and where the vibrations of the handle base will cause the handle member to vibrate; and a capacitive touch sensor located on the handle member, where the touch sensor is configured to recognize when a user grips the handle member. Other embodiments of this aspect include corresponding computer systems, apparatus, and computer programs recorded on one or more computer storage devices, each configured to perform the actions of the methods.

Implementations may include one or more of the following features. The door handle assembly further including a symbol display embedded on the handle frame, where the symbol display is configured to illuminate upon activation. The door handle assembly further including a symbol display embedded on the handle frame, where the symbol display is a visual graphics display configured to generate a graphical user interface (GUI) based symbol upon activation. The door handle assembly where: the handle frame further includes a recessed bowl portion; and a second lighting strip operatively embedded around the recessed bowl portion, the second lighting strip configured to illuminate upon activation. The door handle assembly where: the motor, first lighting strip, second lighting strip, and touch sensor are configured to be operatively connected to a computing device; and the computing device is configured to detect when the touch sensor is being gripped by the user, and where the computing device is configured to activate each of the motor, first lighting strip, and second lighting strip in response to the detection of the touch sensor being gripped by the user. Implementations of the described techniques may include hardware, a method or process, or computer software on a computer-accessible medium.

One general aspect includes a method to alert a vehicle occupant of one or more vehicle related events, the method including: activating, via a computing device, a capacitive touch sensor located on a handle member of a door handle assembly located on a vehicle door; detecting, via the computing device, when the touch sensor is being gripped by a user; in response to detecting the touch sensor being gripped by the user, via the computing device, activating a motor, where activation of the motor causes rotation of a cam, where rotation of the cam will impart vibrations throughout a handle base mounted to the vehicle door, and where the vibrations of the handle base will cause the handle member to vibrate; and in response to detecting the touch sensor being gripped by the user, via the computing device, illuminating a first lighting strip operatively embedded around a peripheral rim portion of a handle frame. Other embodiments of this aspect include corresponding computer systems, apparatus, and computer programs recorded on one or more computer storage devices, each configured to perform the actions of the methods.

Implementations may include one or more of the following features. The method further including, in response to detecting the touch sensor being gripped by the user, via the computing device, illuminating a symbol display embedded on the handle frame. The method further including, in response to detecting the touch sensor being gripped by the user, via the computing device, generating a graphical user interface (GUI) based symbol on a symbol display embedded on the handle frame and where the symbol display is a visual graphics display. The method further including, in response to detecting the touch sensor being gripped by the user, via the computing device, illuminating a second lighting strip operatively embedded around a recessed bowl portion of the handle frame. The method further including: detecting, via the computing device, a vehicle related event; and where the capacitive touch sensor is activated in response to the detection of the vehicle related event. The method further including: detecting, via the computing device, a vehicle related event; after the vehicle related event is detected, determining if the vehicle has stopped moving; and where the capacitive touch sensor is activated based on whether the vehicle has stopped moving. The method further including where the vehicle related event is a child occupying a back-row seat of the vehicle. Implementations of the described techniques may include hardware, a method or process, or computer software on a computer-accessible medium.

One general aspect includes a system to alert a vehicle occupant of one or more vehicle related events, the system including: a memory configured to include one or more executable instructions and a processor configured to execute the executable instructions, where the executable instructions enable the processor to carry out the following steps: activating a capacitive touch sensor located on a handle member of a door handle assembly located on a vehicle door; detecting when the touch sensor is being gripped by a user; in response to detecting the touch sensor being gripped by the user, activating a motor, where activation of the motor causes rotation of a cam, where rotation of the cam will impart vibrations throughout a handle base mounted to the vehicle door, and where the vibrations of the handle base will cause the handle member to vibrate; and in response to detecting the touch sensor being gripped by the user, illuminating a first lighting strip operatively embedded around a peripheral rim portion of a handle frame. Other embodiments of this aspect include corresponding computer systems, apparatus, and computer programs recorded on one or more computer storage devices, each configured to perform the actions of the methods.

Implementations may include one or more of the following features. The system where the executable instructions enable the processor to carryout the additional step of, in response to detecting the touch sensor being gripped by the user, illuminating a symbol display embedded on the handle frame. The system where the executable instructions enable the processor to carryout the additional step of, in response to detecting the touch sensor being gripped by the user, generating a graphical user interface (GUI) based symbol on a symbol display embedded on the handle frame and where the symbol display is a visual graphics display. The system where the executable instructions enable the processor to carryout the additional step of, in response to detecting the touch sensor being gripped by the user, illuminating a second lighting strip operatively embedded around a recessed bowl portion of the handle frame. The system where: the executable instructions enable the processor to carryout the additional step of detecting a vehicle related event; and the capacitive touch sensor is activated in response to the detection of the vehicle related event. The system the executable instructions enable the processor to carryout the additional steps of: detecting a vehicle related event; after the vehicle related event is detected, determining if the vehicle has stopped moving; and where the capacitive touch sensor is activated based on whether the vehicle has stopped moving. The method further including where the vehicle related event is a child occupying a back-row seat of the vehicle. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
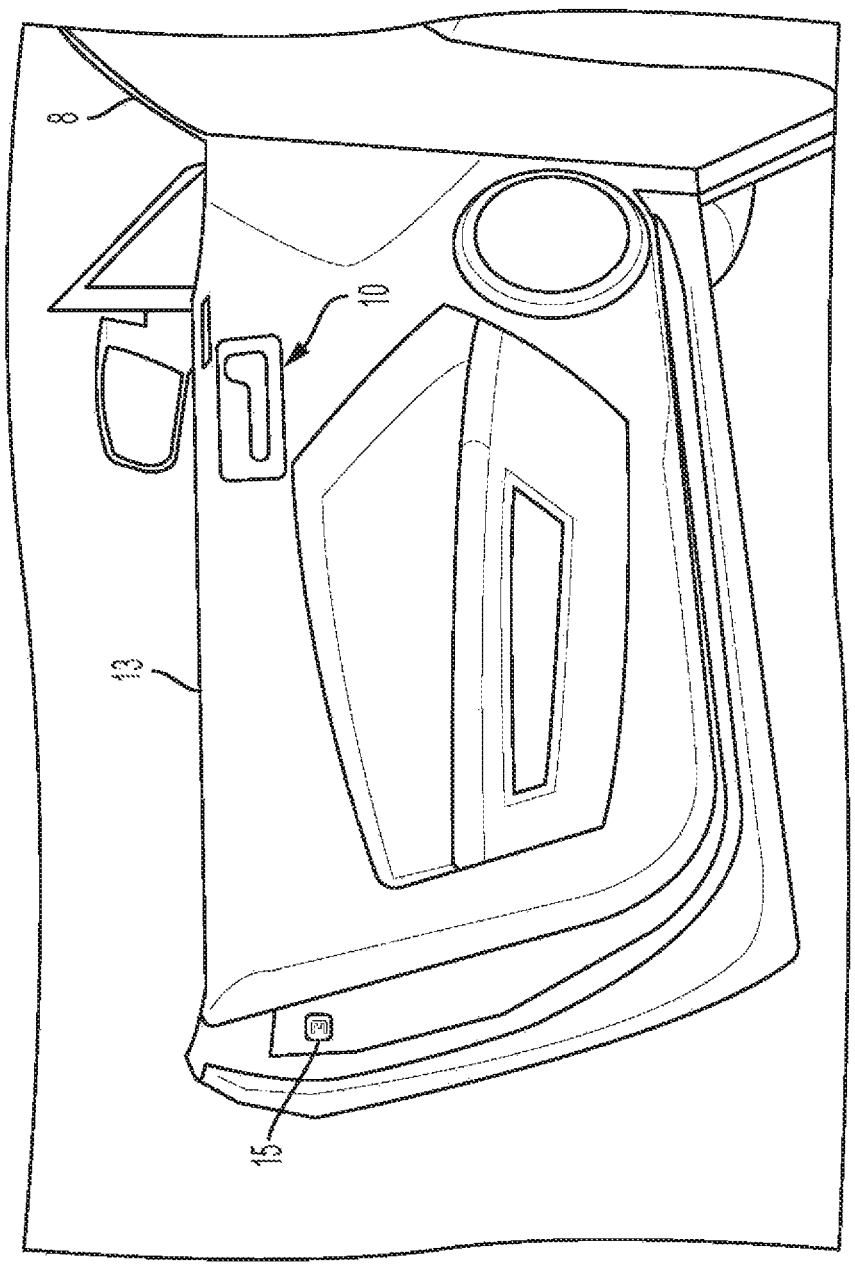
FIG. 1 shows a perspective view of an exemplary door handle assembly in an exemplary environment.

As can be seen in FIG. 1, a vehicle door 13 is a type of door, typically hinged, but sometimes attached by other mechanisms (e.g., tracks), in front of an opening which allows a vehicle occupant (not shown) to enter and exit a vehicle 8. Moreover, the vehicle door 13 can be opened to provide access to the opening, or closed to secure it and these doors 13 can be opened manually by using a door handle assembly 10. As shown herein, the vehicle 8 is depicted in the illustrated embodiment as a passenger car, but it should be appreciated that any other vehicle including, but not limited to, motorcycles, trucks, busses, sports utility vehicles (SUVs), recreational vehicles (RVs), construction vehicles (e.g., bulldozers), trains, trolleys, marine vessels (e.g., boats), aircraft, helicopters, amusement park vehicles, farm equipment, golf carts, trams, etc., can also be used.

Figure 2:
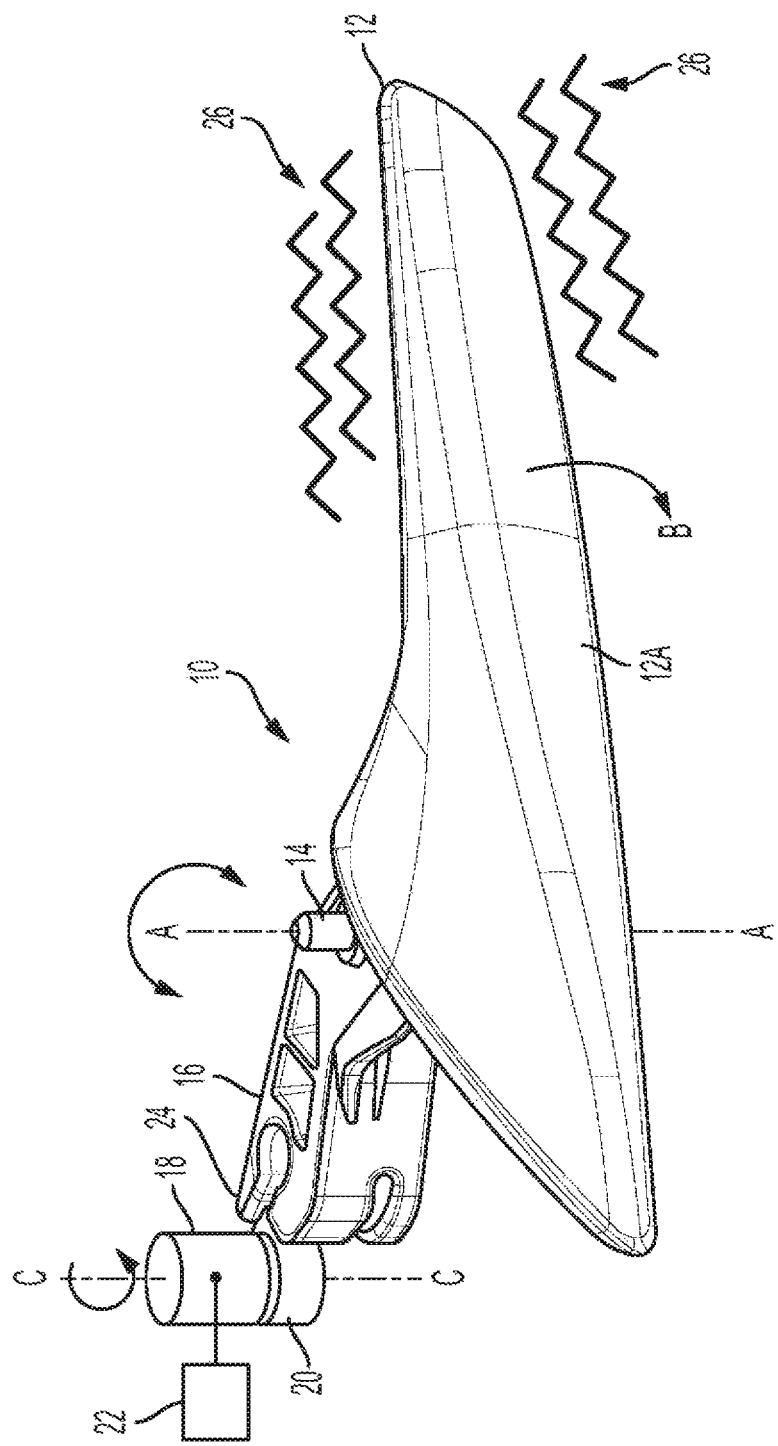
FIG. 2 is a perspective view of an exemplary aspect of an exemplary door handle assembly.
Figure 3:
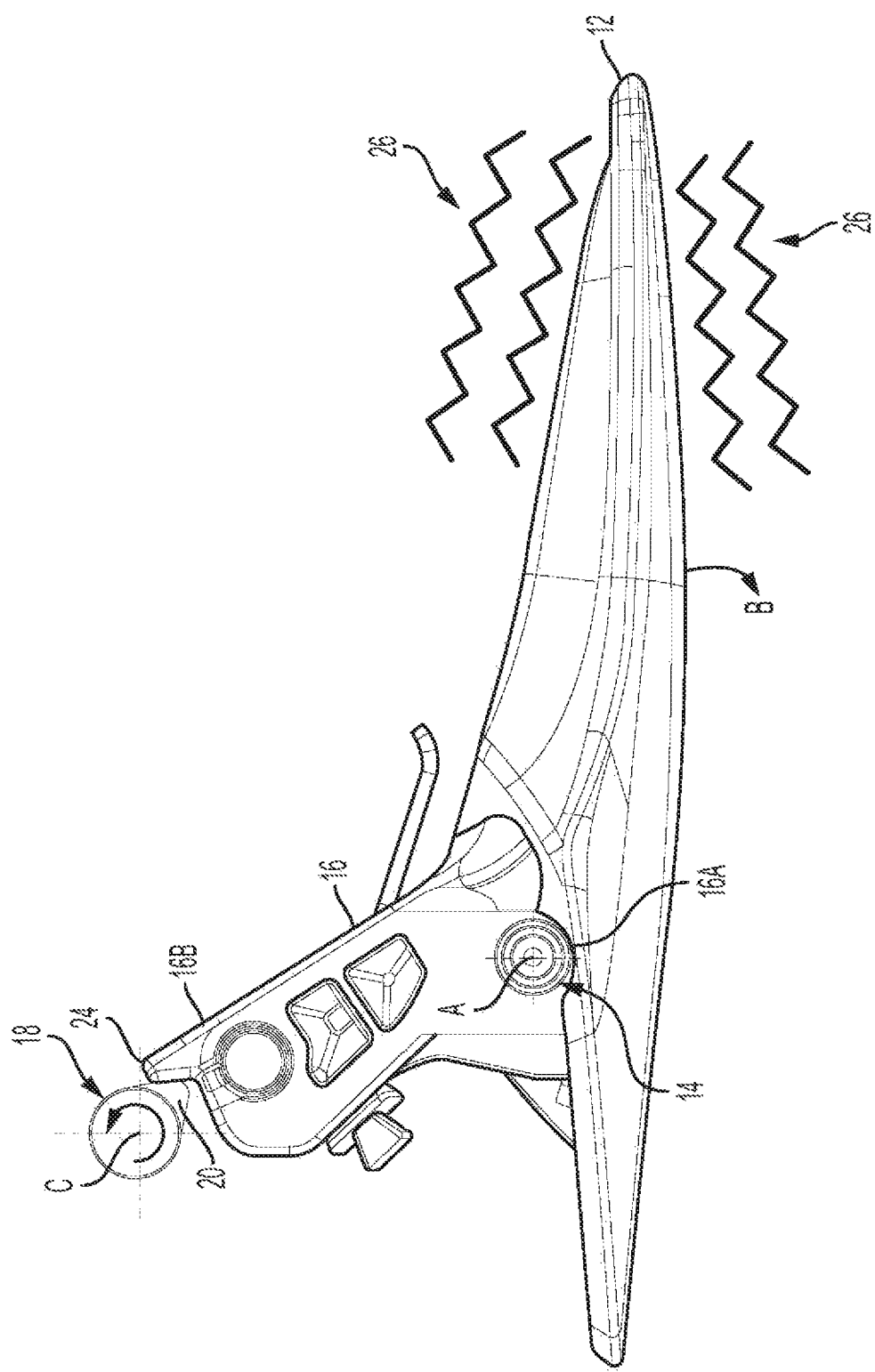
FIG. 3 is a top-down view of an exemplary aspect of the exemplary door handle assembly of FIG. 2.

As shown in FIGS. 2 and 3, an aspect of handle assembly 10 includes a handle member 12 that is pivotably mounted to the interior side of a vehicle door 13 structure by a pin 14 or the like for rotation about a generally vertical axis "A." As such, in use, a user grasps the handle member 12, pulling it outwardly (in the "B" direction) such that the handle 12 rotates about axis A, thereby placing the handle 12 in an unlatched position and thus unlocking a latch mechanism 15 housed within the door 13 and configured to allow the user to open the door and exit the vehicle (as shown in FIG. 1).

A handle base 16 is fixed within the confines of the vehicle door 13. A first end 16A of the base 16 can be moldably connected to the handle member 12 (see FIG. 3) and thus ensures the handle member 12 remains mounted to the interior side of the door. An opposing second end 16B of the base 16 is in operative contact with a motor 18 and cam 20 arrangement, which are installed within the vehicle door and communicatively connected to one or more vehicle computing devices 22 (e.g., a telematics unit, engine control module, or some other vehicle system module). As a result, upon the vehicle computing device 22 sensing an event (e.g., a child being detected in one of the rear seats, as discussed further below), the computing device 22 may activate the motor 18 to rotate cam 20 about a generally vertical "C" axis. Moreover, during this rotation, the cam 20 will make sliding contact with a tab 24 at the second end 16B of base 16 and thus impart vibrations throughout base 16 and in turn cause the body of the handle member 12 to vibrate (represented by reference number 26). It should be understood that embodiments of handle assembly 10 can allow for a user to set the vibration intensity and pattern via a control panel (e.g., a user interface of an infotainment center), which is in communicative contact with computing device 22. It should also be understood that the handle member 12 and base 16 are herein disclosed as two distinct features of one unitary component/piece. However, in other embodiments of door handle assembly 10, the handle member 12 and handle base 16 can be their own independent components operatively connected together, for example, via pin 14.

Figure 4:
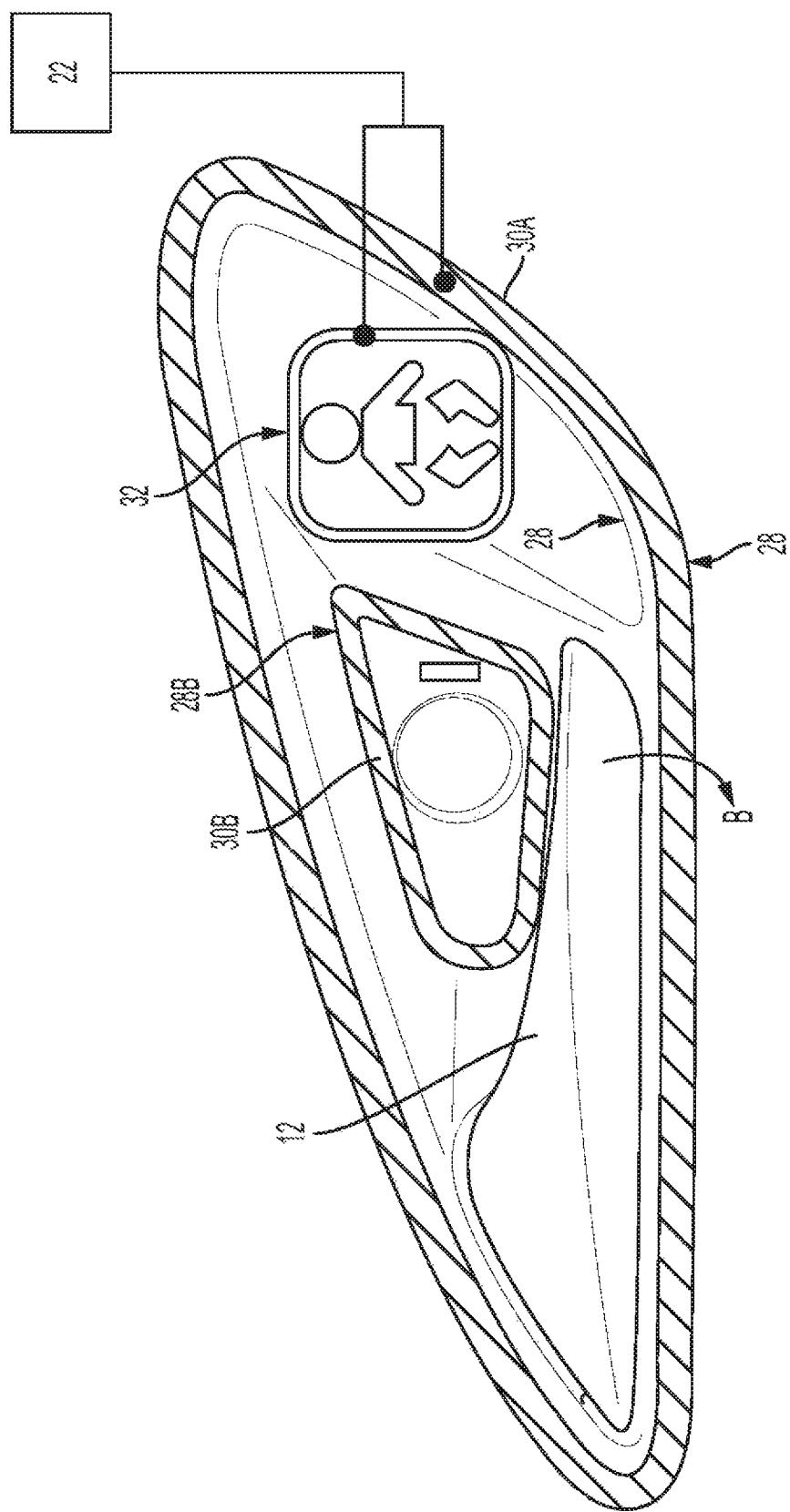
FIG. 4 is a side view of an exemplary aspect of the exemplary door handle assembly of FIG. 2.

Referring to FIG. 4, a handle frame 28 is mounted in a suitable opening in the interior panel of the door 13 and has a generally oval configuration. As such, when the handle assembly 10 is properly installed on the vehicle door 13, handle frame 28 will be situated between the handle base 16 and handle member 12. Furthermore, handle frame 28 includes a peripheral rim portion 28A surrounding a central recessed bowl portion 28B. Drawn-out first and second lighting strips 30A and 30B are operatively embedded around the contours of the peripheral rim portion 28A and recessed bowl portion 28B, respectively. Moreover, both the first and second lighting strips 30A and 30B are communicatively connected to the computing device 22. As follows, when the vehicle computing device 22 senses an event, it may activate one or both strips 30A and 30B to illuminate and provide a glowing light of a certain color (e.g., red) from the interior side of the vehicle door 13. The handle frame 28 may also include an embedded symbol display 32 that can be operatively connected to computing device 22 and can illuminate independently or during operation of the lighting strips 30A and 30B. The symbol display 32 can also be formed to indicate the nature of the alert being provided by computing device 22 (e.g., as shown, displaying a universal symbol of a child to indicate a child is sitting in one of the back-row seats). In addition, the strips 30A and 30B and symbol display can illuminate on and off in a pattern (e.g., the strips and symbol display can blink simultaneously or in some kind of sequence). Skilled artists will see that the first lighting strip 30A, second lighting strip 30B, and symbol display 32 can be constructed from Light Emitting Diodes (LEDs) or Organic Light Emitting Diodes (OLEDs) or some other suitable illuminating device. In one or more embodiments, the symbol display 32 can be embodied as a visual graphics display (a digital display) capable of providing multiple graphical user interface (GUI) symbols and can be used to indicate the nature of a variety of alerts.

Figure 5:
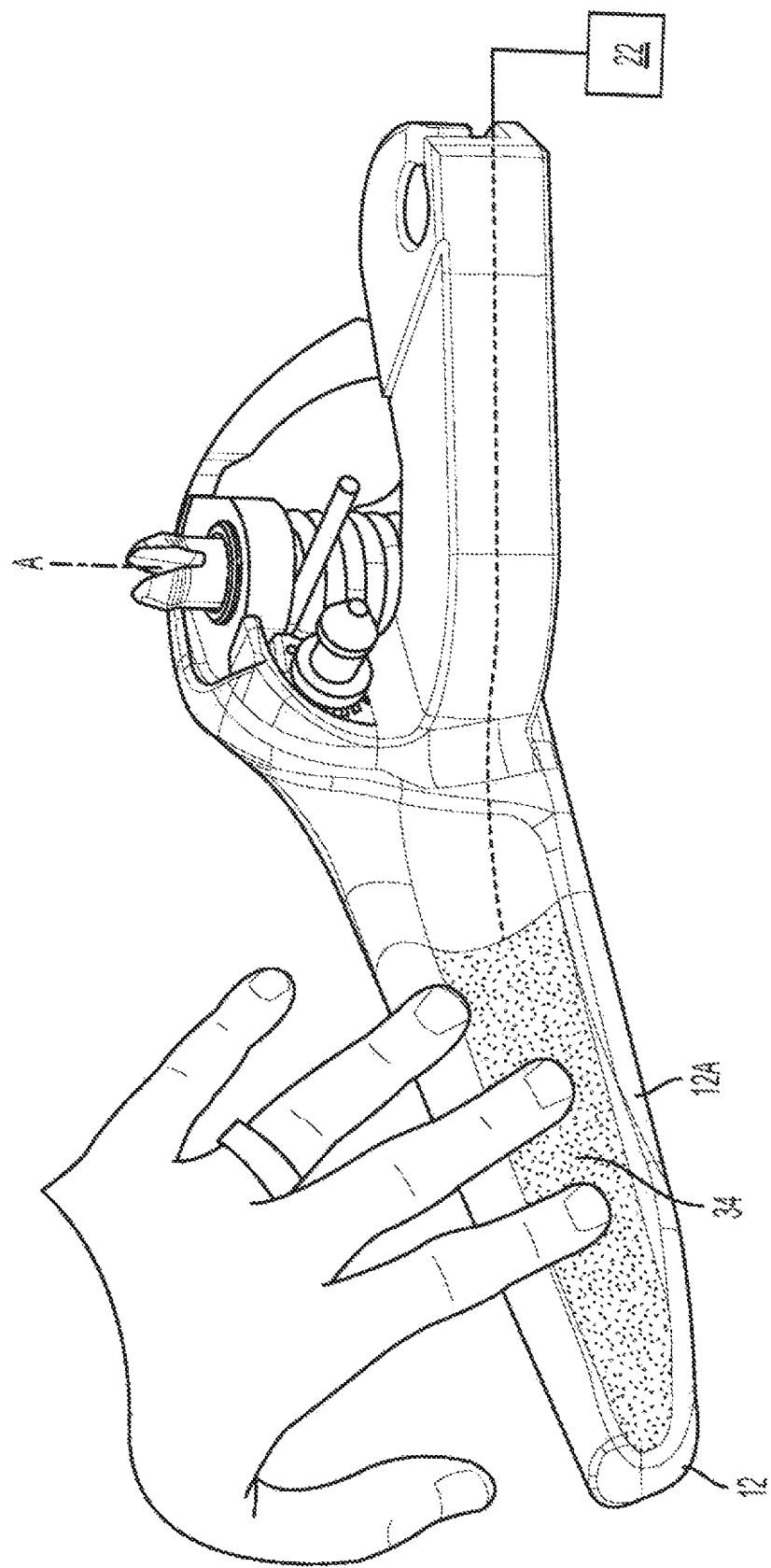
FIG. 5 is a perspective view of an exemplary aspect of the exemplary door handle assembly of FIG. 2 while being used in an exemplary manner.
Figure 6:
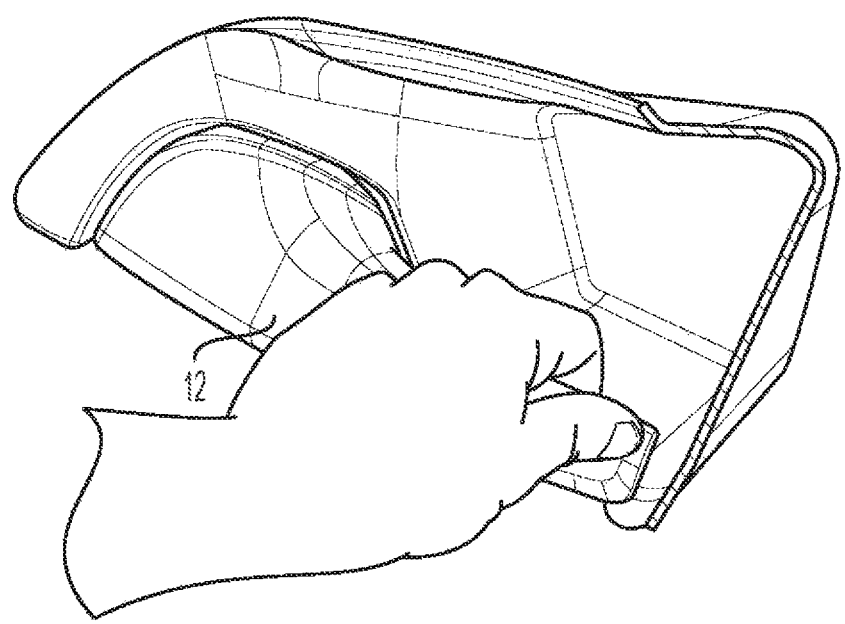
FIG. 6 is a perspective view of another exemplary aspect of the exemplary door handle assembly of FIG. 2 while being used in an exemplary manner.

Referring to FIGS. 5 and 6, handle 12 can be constructed from a rigid material such as, for example, metal, plastic, or resin. Handle 12 has an elongated configuration and includes a main body grip portion 12A with a capacitive touch sensor 34 embedded therein or installed onto the handle's backside (inner surface). Touch sensor 34 is communicatively connected to the computing device 22. As follows, upon a user gripping handle 12 (FIG. 6), the touch sensor 34 can recognize the occurrence of this gripping action and send a signal to the computing device 22.

METHOD

The method or parts thereof can be implemented in a computer program product (e.g., computing device 22) embodied in a computer readable medium and including instructions usable by one or more processors of one or more computers of one or more systems to cause the system(s) to implement one or more of the method steps. The computer program product may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media, which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

Figure 7:
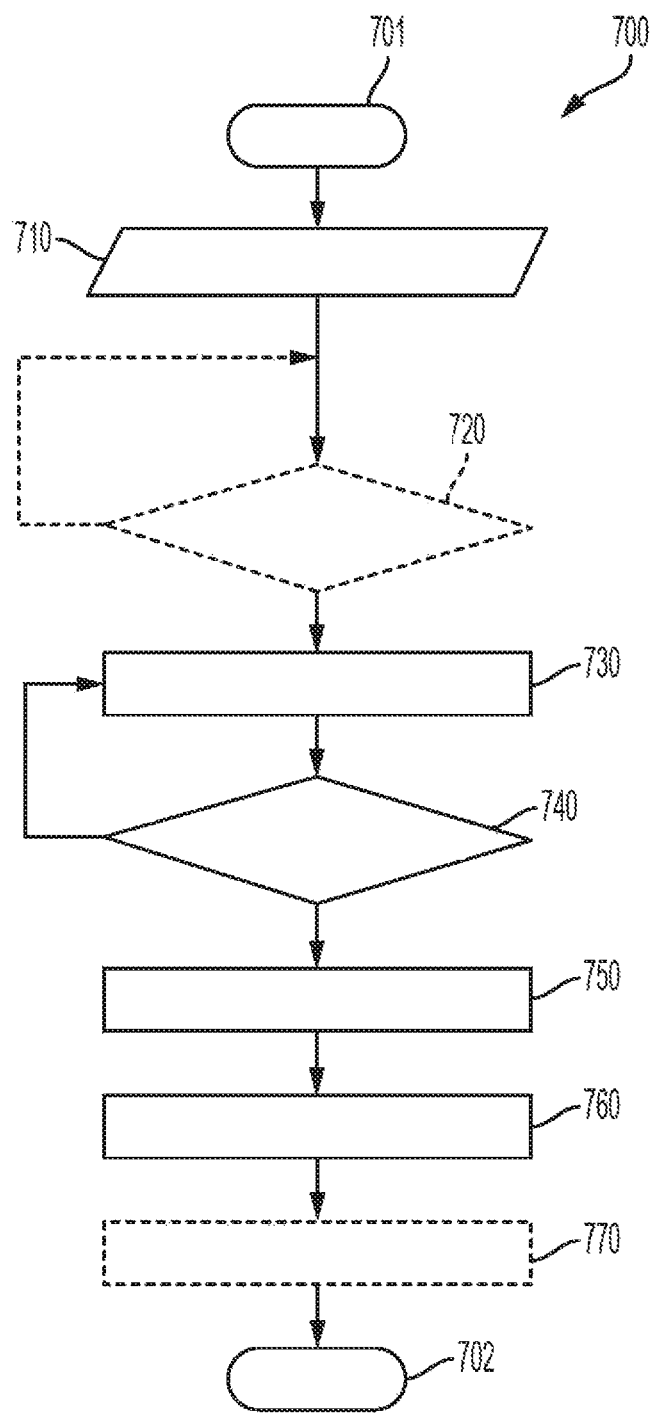
FIG. 7 is a flowchart of an exemplary process to activate an exemplary door handle assembly.

Turning now to FIG. 7, there is shown an embodiment of a method 700 to alert a vehicle occupant of one or more vehicle related situations while they are attempting to exit their vehicle. One or more aspects of the occupant alert method 700 may be completed through computing device 22. One or more ancillary aspects of method 700 may be completed through door handle assembly 10.

Method 700 is supported by computing device 22 being configured to communicate with components of the door handle assembly, for example, the lighting strips 30A and 30B, motor 18, and capacitive touch sensor 34. This configuration may be established by a vehicle manufacturer at or around the time of vehicle assembly or after-market (e.g., at a time of vehicle service). In at least one implementation, one or more instructions are provided to the computing device 22 and stored on non-transitory computer-readable medium (not shown).

Figure 8:
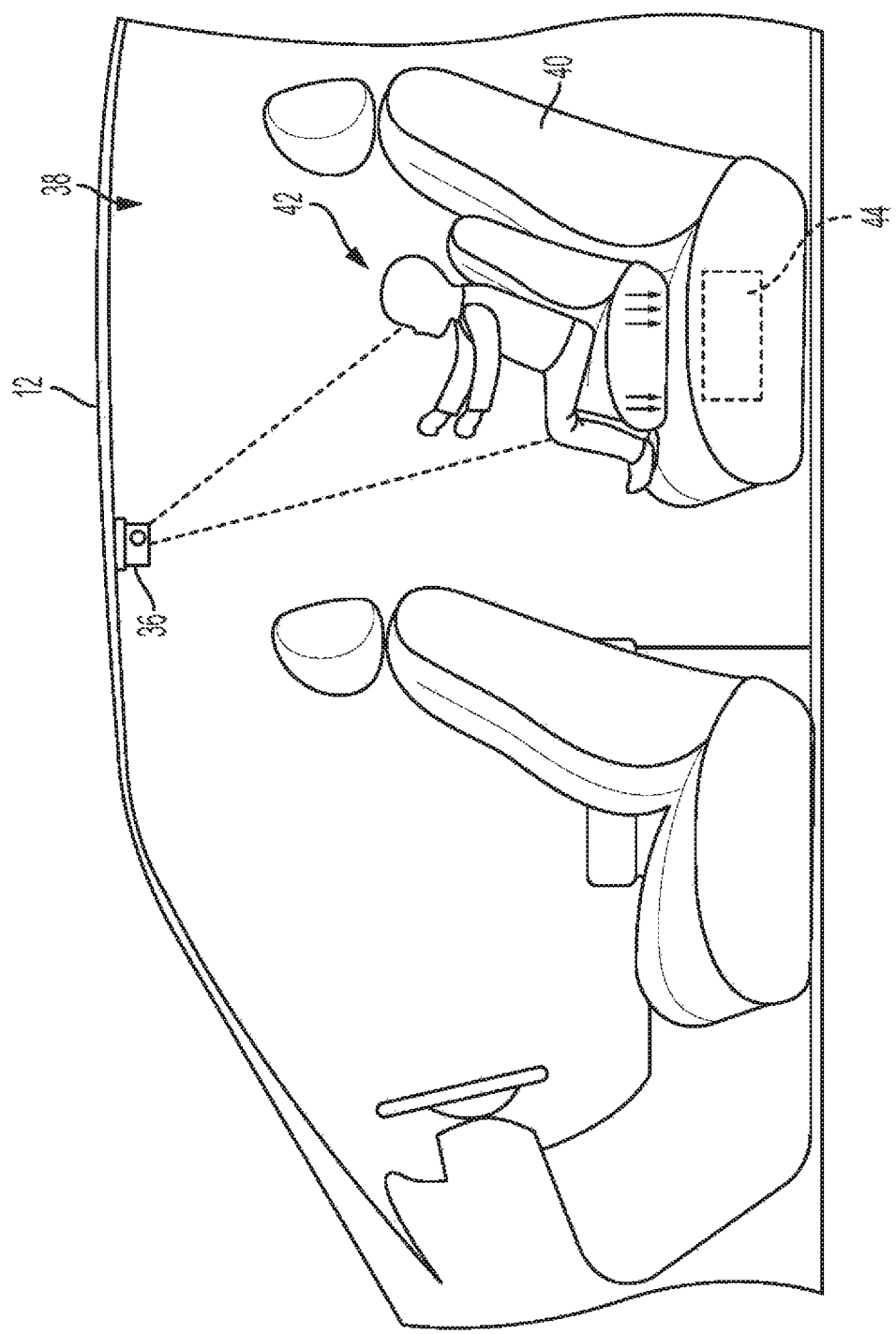
FIG. 8 shows an exemplary aspect of the process of FIG. 7.

Method 700 begins with a vehicle occupant (e.g., vehicle operator) being located within a cabin of vehicle 8 (e.g., in the driver seat). In step 710, computing device 22 senses a vehicle related event using one or more vehicle systems and/or vehicle sensors. In one or more embodiments, computing device 22 senses a child or animal may be detected as occupying one of the back-row seats of the vehicle 8. For example, with additional reference to FIG. 8, computing device 22 may activate a camera 36 located in the vehicle interior 38 to capture an image of the back-row seating 40 and may also use object recognition software to determine if a child 42 (or pet) is seated in at least one of the back-row seats 40. In an alternative embodiment, computing device 22 may use feedback from a seat weight sensor 44 (to detect the weight of the child 42) as well as passenger door sensor (not shown—to detect if someone entered into the back-row area of the vehicle cabin 38) to determine whether a child 42 (or pet) are seated in one of the back-rows 40. It should be understood that these are just two examples of rear seat occupancy detection techniques and that many other known detections techniques exist.

In another embodiment of a vehicle related event, computing device 22 senses a pedestrian, vehicle, or cyclist is approaching the vehicle from its rear through one or more known techniques. For example, computing device 22 may activate a rear-view camera (i.e., the back up camera) to record images of the environment behind the vehicle and may also use object recognition software to determine if a pedestrian, vehicle, or cyclist is rapidly approaching the vehicle from its rear. In another embodiment of a vehicle related event, computing device 22 senses that one or more of the vehicle windows are in a rolled down condition. In another embodiment of a vehicle related event, computing device 22 senses that the vehicle transmission is in a neutral state (i.e., not in a gear) or in the drive gear (i.e., the computing device 22 senses that the vehicle transmission is not in the park position). Once a vehicle related event has been sensed, method 700 will move to optional step 720.

In optional step 720, computing device 22 determines if the vehicle is moving or if it is not moving (the speed has been reduced to zero (0) miles per hour). If the vehicle is moving, then computing device 22 will return to monitoring its speed (via the speedometer) and will continue monitoring the vehicle speed at least until the vehicle has stopped. Alternatively, if the vehicle has stopped moving (i.e., it is standing still), method 700 will move to step 730.

In step 730, the computing device 22 will activate the capacitive touch sensor 34 of the door handle assembly 10. In step 740, computing device 22 will determine if a change in capacitance has occurred at touch sensor 34. As follows, when a change in capacitance occurs, it is an indication that the user has gripped the handle 12 and desires to exit the vehicle (i.e., they are attempting to leave the vehicle). If a capacitance change has occurred, the method 700 will move to step 750. Otherwise, computing device 22 will return monitoring the output of touch sensor 34 at least until the output signals a change in capacitance.

In step 750, computing device 22 will activate motor 18 to rotate cam 20 as discussed above. In response, the base 16 and body of handle 12 will vibrate accordingly and in a preset pattern (i.e., the handle 12 will oscillate around the hinge point at pin 14 according to a preconfigured pattern). In step 760, computing device 22 will activate at least one of the lighting strips 30A and 30B. In response, one or both of the lighting strips 30A and 30B will illuminate, which may be intermittently so as to facilitate grabbing the attention of the user. For example, the lighting strips 30A and 30B will glow red and blink every few seconds. In step 770, computing device 22 will activate symbol display 32. When the symbol display 32 is embodied as a simple LED or OLED screen, activation will involve a simple illumination of the lights to display the symbol embedded on handle frame 28 (e.g., molded or painted onto the frame). When the symbol display 32 is embodied as a digital graphics display, computing device 22 will display a GUI generated symbol that conforms to the specific vehicle related event that has been sensed. After step 770, method 700 will move to completion.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for" in the claim or in the case of a method claim using the phrases "operation for" or "step for" in the claim.

What is claimed is:

1. A door handle assembly for a vehicle door, the door handle assembly comprising:
   a handle base fixed to the vehicle door;
   a handle member for opening the vehicle door, wherein the handle member is movable between latched and unlatched positions;
   a handle frame mounted to the vehicle door and interposed between the handle base and handle member, the handle frame comprises a peripheral rim portion and a recessed bowl portion;
   a first lighting strip operatively embedded around the peripheral rim portion, the first lighting strip configured to illuminate upon activation;
   a second lighting strip operatively embedded around the recessed bowl portion, the second lighting strip configured to illuminate upon activation;
   a motor and a cam, wherein the cam is in operative contact with a second end of the handle base, wherein the motor will cause the cam to rotate upon activation, wherein rotation of the cam will impart vibrations throughout the handle base, and wherein the vibrations of the handle base will cause the handle member to vibrate;
   a capacitive touch sensor located on the handle member, wherein the touch sensor is configured to recognize when a user grips the handle member;
   wherein the motor, first lighting strip, second lighting strip, and touch sensor are configured to be operatively connected to a computing device; and
   wherein the computing device is configured to detect when the touch sensor is being gripped by the user, and wherein the computing device is configured to activate each of the motor, first lighting strip, and second lighting strip in response to the detection of the touch sensor being gripped by the user.

2. The door handle assembly of claim 1, further comprising a symbol display embedded on the handle frame, wherein the symbol display is configured to illuminate upon activation.

3. The door handle assembly of claim 1, further comprising a symbol display embedded on the handle frame, wherein the symbol display is a visual graphics display configured to generate a graphical user interface (GUI) based symbol upon activation.

4. A method to alert a vehicle occupant of one or more vehicle related events, the method comprising:
   activating, via a computing device, a capacitive-touch sensor located on a handle member of a door handle assembly located on a vehicle door;
   detecting, via the computing device, when the touch sensor is being gripped by a user;
   in response to detecting the touch sensor being gripped by the user, via the computing device, activating a motor, wherein activation of the motor causes rotation of a cam, wherein rotation of the cam will impart vibrations throughout a handle base mounted to the vehicle door, and wherein the vibrations of the handle base will cause the handle member to vibrate; and
   in response to detecting the touch sensor being gripped by the user, via the computing device, illuminating a first lighting strip operatively embedded around a peripheral rim portion of a handle frame.

5. The method of claim 4, further comprising, in response to detecting the touch sensor being gripped by the user, via the computing device, illuminating a symbol display embedded on the handle frame.

6. The method of claim 4, further comprising, in response to detecting the touch sensor being gripped by the user, via the computing device, generating a graphical user interface (GUI) based symbol on a symbol display embedded on the handle frame and wherein the symbol display is a visual graphics display.

7. The method of claim 4, further comprising, in response to detecting the touch sensor being gripped by the user, via the computing device, illuminating a second lighting strip operatively embedded around a recessed bowl portion of the handle frame.

8. The method of claim 4, further comprising:
   detecting, via the computing device, the one or more vehicle related events; and
   wherein the touch sensor is activated in response to the detection of the vehicle related event.

9. The method of claim 4, further comprising:
   detecting, via the computing device, the one or more vehicle related events;
   after the vehicle related event is detected, determining if the vehicle has stopped moving; and
   wherein the touch sensor is activated based on whether the vehicle has stopped moving.

10. The method of claim 4, wherein the vehicle related event is a child occupying a back-row seat of the vehicle.

11. A system to alert a vehicle occupant of one or more vehicle related events, the system comprising:
    a memory configured to comprise one or more executable instructions and a processor configured to execute the executable instructions, wherein the executable instructions enable the processor to carry out the following steps:
       activating a capacitive touch sensor located on a handle member of a door handle assembly located on a vehicle door;
       detecting when the touch sensor is being gripped by a user;
       in response to detecting the touch sensor being gripped by the user, activating a motor, wherein activation of the motor causes rotation of a cam, wherein rotation of the cam will impart vibrations throughout a handle base mounted to the vehicle door, and wherein the vibrations of the handle base will cause the handle member to vibrate; and
       in response to detecting the touch sensor being gripped by the user, illuminating a first lighting strip operatively embedded around a peripheral rim portion of a handle frame.

12. The system of claim 11, wherein the executable instructions enable the processor to carryout the additional step of, in response to detecting the touch sensor being gripped by the user, illuminating a symbol display embedded on the handle frame.

13. The system of claim 11, wherein the executable instructions enable the processor to carryout the additional step of, in response to detecting the touch sensor being gripped by the user, generating a graphical user interface (GUI) based symbol on a symbol display embedded on the handle frame and wherein the symbol display is a visual graphics display.

14. The system of claim 11, wherein the executable instructions enable the processor to carryout the additional step of, in response to detecting the touch sensor being gripped by the user, illuminating a second lighting strip operatively embedded around a recessed bowl portion of the handle frame.

15. The system of claim 11, wherein:
the executable instructions enable the processor to carryout the additional step of detecting the one or more vehicle related events; and
the touch sensor is activated in response to the detection of the vehicle related event.

16. The system of claim 11, the executable instructions enable the processor to carryout the additional steps of:
detecting the one or more vehicle related events;
after the vehicle related event is detected, determining if the vehicle has stopped moving; and
wherein the touch sensor is activated based on whether the vehicle has stopped moving.

17. The system of claim 16, wherein the vehicle related event is a child occupying a back-row seat of the vehicle.

* * * * *